(12) United States Patent
Love et al.

(10) Patent No.: US 9,716,846 B2
(45) Date of Patent: Jul. 25, 2017

(54) FULL-FRAME, PROGRAMMABLE HYPERSPECTRAL IMAGER

(71) Applicant: Los Alamos National Security, LLC, Los Alamos, NM (US)

(72) Inventors: Steven P. Love, Los Alamos, NM (US); David L. Graff, Los Alamos, NM (US)

(73) Assignee: LOS ALAMOS NATIONAL SECURITY, LLC, Los Alamos, NM (US)

( * ) Notice: Subject to any disclaimer, the term of this patent is extended or adjusted under 35 U.S.C. 154(b) by 329 days.

(21) Appl. No.: 14/348,001

(22) PCT Filed: Sep. 28, 2012

(86) PCT No.: PCT/US2012/000417
§ 371 (c)(1),
(2) Date: Mar. 27, 2014

(87) PCT Pub. No.: WO2013/048548
PCT Pub. Date: Apr. 4, 2013

(65) Prior Publication Data
US 2014/0240514 A1    Aug. 28, 2014

Related U.S. Application Data

(60) Provisional application No. 61/541,789, filed on Sep. 30, 2011.

(51) Int. Cl.
*H04N 5/33* (2006.01)
*G01J 3/28* (2006.01)
*G01J 3/02* (2006.01)

(52) U.S. Cl.
CPC ............ *H04N 5/332* (2013.01); *G01J 3/0208* (2013.01); *G01J 3/0229* (2013.01); *G01J 3/2823* (2013.01)

(58) Field of Classification Search
CPC ...... G01J 3/2823; G01J 3/0208; G01J 3/0229; H04N 5/332
(Continued)

(56) References Cited

U.S. PATENT DOCUMENTS

| 4,494,872 A * | 1/1985 | Busch ...................... G01J 3/02 356/328 |
| 6,504,943 B1 * | 1/2003 | Sweatt ............... G02B 27/1086 348/169 |

(Continued)

FOREIGN PATENT DOCUMENTS

| JP | 2001519913 | 10/2001 |
| JP | 2006259153 | 9/2006 |

(Continued)

OTHER PUBLICATIONS

International Search Report and Written Opinion, mailed Dec. 17, 2012, by U.S. Patent Office for corresponding PCT Patent Application No. PCT/US2012/000417, 15 pages.
(Continued)

*Primary Examiner* — Gelek W Topgyal
(74) *Attorney, Agent, or Firm* — King & Spalding LLP

(57) ABSTRACT

A programmable, many-band spectral imager based on addressable spatial light modulators (ASLMs), such as micro-mirror-, micro-shutter- or liquid-crystal arrays, is described. Capable of collecting at once, without scanning, a complete two-dimensional spatial image with ASLM spectral processing applied simultaneously to the entire image, the invention employs optical assemblies wherein light from all image points is forced to impinge at the same angle onto the dispersing element, eliminating interplay between spatial position and wavelength. This is achieved, as examples, using telecentric optics to image light at the required constant angle, or with micro-optical array structures, such as micro-lens- or capillary arrays, that aim the light on a
(Continued)

pixel-by-pixel basis. Light of a given wavelength then emerges from the disperser at the same angle for all image points, is collected at a unique location for simultaneous manipulation by the ASLM, then recombined with other wavelengths to form a final spectrally-processed image.

21 Claims, 9 Drawing Sheets

(58) Field of Classification Search
USPC .................................. 356/300, 326; 348/164
See application file for complete search history.

(56) References Cited

U.S. PATENT DOCUMENTS

| | | | | |
|---|---|---|---|---|
| 6,813,018 | B2* | 11/2004 | Richman | G01J 3/02 356/305 |
| 6,996,292 | B1* | 2/2006 | Gentry | G01J 3/02 356/305 |
| 7,018,519 | B1 | 3/2006 | Siebert et al. | |
| 7,119,911 | B2 | 10/2006 | Tyczka et al. | |
| 7,289,209 | B2 | 10/2007 | Kowarz et al. | |
| 2004/0021934 | A1* | 2/2004 | Cook | G01J 3/02 359/366 |
| 2005/0243312 | A1* | 11/2005 | Geshwind | G01J 3/02 356/310 |
| 2005/0270528 | A1* | 12/2005 | Geshwind | G01J 3/02 356/330 |
| 2006/0017924 | A1* | 1/2006 | Kowarz | G01J 3/32 356/330 |
| 2006/0050278 | A1* | 3/2006 | Treado | G01N 21/255 356/417 |
| 2007/0146710 | A1* | 6/2007 | Kowarz | G01N 21/255 356/416 |
| 2010/0309467 | A1 | 12/2010 | Fox et al. | |
| 2011/0205536 | A1* | 8/2011 | Johnsen | G01J 3/06 356/326 |
| 2011/0279744 | A1* | 11/2011 | Voigt | G02B 5/208 349/18 |
| 2014/0354996 | A1* | 12/2014 | Fontecchio | G02F 1/13342 356/416 |

FOREIGN PATENT DOCUMENTS

| | | |
|---|---|---|
| JP | 2010067441 | 3/2010 |
| JP | 2011118070 | 6/2011 |

OTHER PUBLICATIONS

Steven P. Love, "Programmable matched filter and Hadamard transform hyperspectral imagers based on micro-mirror arrays," *Proc. of SPIE*, vol. 7210, pp. 721107-1-721007-15 (2009).

* cited by examiner

FULL-FRAME, PROGRAMMABLE HYPERSPECTRAL IMAGER

CROSS REFERENCE TO RELATED APPLICATIONS

The present application is the U.S. National Stage of International Application No. PCT/US2012/000417, filed Sep. 28, 2012, which was published in English under PCT Article 21(2), which in turn claims the benefit of U.S. Provisional Application No. 61/541,789, filed Sep. 30, 2011, the entirety of which are incorporated herein by this reference.

STATEMENT REGARDING FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates generally to spectral and spatial imaging and, more particularly, to programmable multi-band spectral filtering, and to hyperspectral imaging in which each pixel contains a high-resolution spectrum.

BACKGROUND AND SUMMARY

Spectral imaging, in particular hyperspectral imaging in which each pixel contains a high-resolution spectrum, has proven to be valuable for remote detection, identification and quantification of chemical species, in applications ranging from proliferation detection to environmental monitoring, planetary science, and medical imaging. The spectral content of each pixel is typically analyzed for the presence of various chemicals or materials of interest which have spectral signatures in the spectral region investigated. As currently implemented, hyperspectral imaging is inherently slow, typically requiring several seconds to obtain a single image. Monitoring phenomena occurring on timescales faster than this has necessitated sacrificing either spectral specificity (that is, reducing the spectral component to a simple band-pass filter in front of a fast camera), or sacrificing spatial information and simply aiming a spectrometer at a point (or, at most, a line). Both of these options are unsatisfactory for a variety of reasons.

One existing programmable HSI system is described in "Programmable Matched Filter And Hadamard Transform Hyperspectral Imagers Based On Micro-Mirror Arrays" by Steven P. Love, Proc. of SPIE, Vol. 7210, 721007 (2009), the entirety of the disclosure and teachings of which document are hereby specifically incorporated by reference herein. Unfortunately, the Love programmable HSI must either scan the spectral patterns across the MMA or scan the direction of aiming of the instrument to produce a full two-dimensional spatial image having the desired spectral processing. As such, the development of a programmable spectral filter had been stymied by the intertwining of spatial and spectral directions that is a feature of nearly all imaging spectrometer designs. Accordingly, there is a need for an improved full-framed hyperspectral imaging apparatus and/or system. As described in detail below, embodiments of the present invention overcome the disadvantages and limitations of the state of the art by providing an apparatus for obtaining a full-frame hyperspectral image without the requirement of either an external push-broom scan or of scanning the image on the micro-mirror array in order to generate spectral/spatial information wherein the spectral data is properly associated with the spatial data.

A preferred embodiment of the present invention can include an initial optical subsystem receiving incident light and generating an image including spatially invariant light propagation defining a substantially spatially invariant angle of incidence at a first predetermined location having an image plane; a dispersive element disposed at the predetermined location to receive the image at the substantially spatially invariant angle of incidence and to generate wavelength dispersed light; and a second optical subsystem receiving the wavelength dispersed light and generating a spatially dispersed spectrum at a second predetermined location such that in at least one dimension of a spectral plane, substantially all light of a predetermined wavelength is directed to a substantially identical position within the spectral plane. The preferred apparatus can further include a selective element disposed at the second predetermined location and optically coupled to the dispersive element, the selective element configured to programmably modulate an amplitude of light at one or more locations in the spectral plane to produce spectrally modified light; and a detector receiving the spectrally modified light from the selective element. As described below, preferably the spectrally modified light includes an image representation of the incident light in which the spectral content has been modified by the selective element in one or more spectral bands, and further preferably such spectral modification is substantially identical for substantially all locations in the image representation.

Benefits and advantages of embodiments of the present invention include, but are not limited to, providing an apparatus for performing full spatial frame micro-mirror-array-based spectral processing without wavelength shifts over the entire two-dimensional image, wherein spectral imaging can be performed without scanning and at speeds limited only by the detector employed. Compared to current hyperspectral imaging devices, the imaging time for a given area for embodiments of the present invention potentially can be reduced by factors of several hundred.

DETAILED DESCRIPTION OF THE PREFERRED EMBODIMENTS

Figure 1:
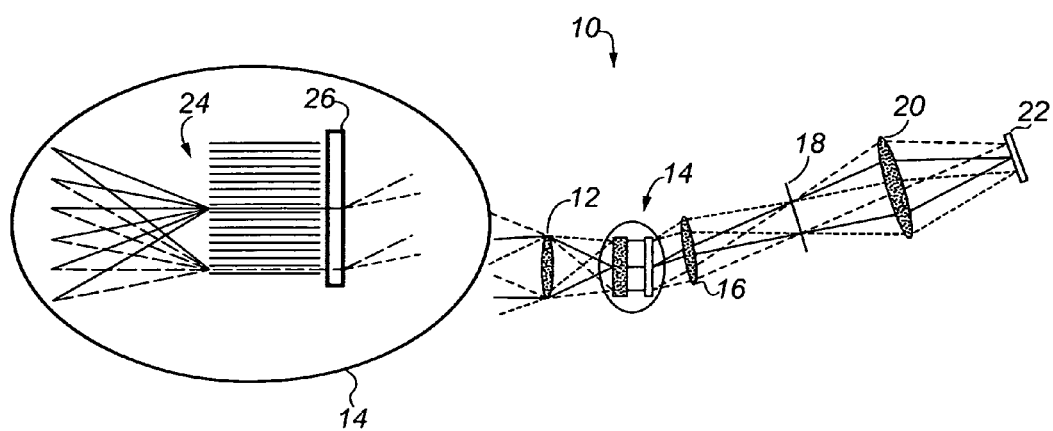
FIG. 1 is a schematic representation of a full-frame, multi-band programmable spectral imaging apparatus in accordance with a preferred embodiment of the present invention.

The following description of the preferred embodiments of the present invention and variations thereof is made with reference to the Figures and one or more illustrative example configurations and/or implementations. Those of skill in the art will recognize that the following description is for illustrative purposes only, and that the scope of the present invention is defined exclusively by the following claims.
Preferred Apparatus As described in detail below with reference to FIGS. 1 through 6, the apparatus of the preferred embodiment can include an initial optical subsystem receiving incident light and generating an image including spatially invariant light propagation defining a substantially spatially invariant angle of incidence at a first predetermined location having an image plane; a dispersive element disposed at the predetermined location to receive the image at the spatially invariant angle of incidence and to generate wavelength dispersed light; and a second optical subsystem receiving the wavelength dispersed light and generating a spatially dispersed spectrum at a second predetermined location such that in at least one dimension of a spectral plane, substantially all light of a predetermined wavelength is directed to a substantially identical position within the spectral plane. The preferred apparatus can further include a selective element disposed at the second predetermined location and optically coupled to the dispersive element, the selective element configured to programmably modulate an amplitude of light at one or more locations in the spectral plane to produce spectrally modified light; and a detector receiving the spectrally modified light from the selective element. Preferably, the spectrally modified light includes an image representation of the incident light in which the spectral content has been modified by the selective element in one or more spectral bands, and further preferably such spectral modification is substantially identical for substantially all locations in the image representation.

Those of skill in the art will readily appreciate that the preferred apparatus and variations thereof can be readily coupled with one or more image processing and/or visualization components, including for example a display, user interface, image processing hardware/firmware/software, and/or any suitable combination thereof. Any such combination of image processing and/or visualization components can be integral or distributed with respect to the preferred apparatus. In other variations of the preferred apparatus, one or more communications modules can be included so as to permit the preferred apparatus to be used in a remote sensing application and/or on board a remote sensing vehicle such as a reconnaissance aircraft, unmanned drone, satellite, and the like.

Aspects of the apparatus of the preferred embodiment can be varied according to the strategy used to ensure that light originating from every image point impinges on the spectrum-dispersing element at substantially the same angle of incidence in the dispersion dimension. First variations of the preferred apparatus can utilize microscopic array optics, such micro-lens arrays, aperture arrays, micro-louver arrays, and capillary arrays, arranged in combination so as to direct light in the required direction and to reject rays propagating in other directions. Second variations of the preferred apparatus can utilize traditional macroscopic optics and achieves the desired condition by arranging the initial imaging optics and entrance pupil in a configuration that is telecentric in image space for the initial image on the dispersing element. Those of skill in the optical arts will appreciate that there are numerous combinations and permutations of optical elements, both microscopic and traditional, that can achieve the desired optical conditions set forth below in the specifically illustrated preferred embodiments of the apparatus.

As shown in FIG. 1, in a first preferred apparatus 10 light from an initial imaging optic 12 is focused to form an image at a first optical assembly 14. Preferably, the first optical assembly 14 can include a stack of thin, parallel plates 14, the surfaces of which are preferably blackened to absorb light and that are spaced so as to allow light to pass between them. The first optical assembly 14 can include a micro-louvre array 24, which preferably functions to select and transmit only those rays traveling in the desired direction and to absorb all others. The desired direction for any ray so selected is such that the component of its propagation vector lying in the spectral dispersion plane is the same for all rays regardless of location within the image. The orthogonal component of the propagation vector is allowed by the micro-louvre array 24 to take on any value, as this component does not affect the subsequent spectral dispersion. The light rays thus selected by the micro-louvre array 24 preferably impinge on a transmission grating 26, which disperses the light into its spectral components. As shown in FIG. 1, a focusing optic 16 preferably collects the spectrally dispersed light and focuses it to a spatially-dispersed spectrum at a well-defined spectral plane. Because of the action of the micro-louvre array 24, light of each wavelength is focused to a single uniquely located line in the spectral plane, regardless of where in the original image the light originated. An addressable spatial light modulator 18, in this implementation of the preferred apparatus 10 a micro-mirror array 18, is disposed at this spectral plane. The micro-mirror array 18 preferably functions to turn any desired wavelength band or set of bands either on or off, and do so for the same wavelengths throughout the entire two-dimensional image. As shown in FIG. 1, a final imaging optic 20 can preferably collect light in the wavelength bands passed by the micro-mirror array 18, recombine these wavelength components, and focus the light to a final spectrally-filtered image at a detector array 22. The detector array 22 can include a CCD array or any other suitable array or system of photodetectors, as desired and/or optimal for the subject light characteristics and conditions.

In the first preferred apparatus 10 shown in FIG. 1, an image lies at the front of the micro-louvre 24, and the initial grating plane is neither a pupil or an image, but, because of the action of the micro-louvre array 24, has some characteristics of both. Preferably, a micro-mirror array 18 is disposed at a pupil as far as the spatial image is concerned such that there is no spatial image on the micro-mirror array 18, but each wavelength is focused to a line at this plane, with contributions from all spatial image points coming together onto the same line for any given wavelength. That is, each spatial image point is dispersed as a spectrum at the micro-mirror array plane, and these spectra overlap with matched wavelengths for all spatial points. The final imaging optic 20 preferably reverses the action of the post-grating optic 14, recombining the wavelengths from each image point to form a spectrally-manipulated white light image at the detector array 20. The optics 14, 20 can be simple lenses, mirrors, multi-element lens groups, and/or any suitable combination thereof. As noted above, the detector array 20 can include a charge-coupled device (CCD) or any other suitable type of photodetector.

In one variation of the first preferred apparatus 10, the micro-louvre array 24 can be replaced with a blackened capillary array, which preferably rejects non-collimated rays in both the spectral dispersion dimension and in the orthogonal dimension. In this variation of the first preferred apparatus 10, an image of the scene exists at the transmission grating 26, but the light field impinging on the transmission grating 26 is pupil-like in that it consists of parallel bundles of rays emerging from the capillary tubes. With the angle of incidence onto the grating the same for all image points, the diffraction angle is a function of wavelength only. Thus, a lens or other optical element 16 placed immediately after the transmission grating 26 will image each wavelength onto a single line at the spectral image plane, regardless of the original spatial position. A micro-mirror array 18 at this plane then preferably selects which wavelengths are passed and which are rejected, and does so in the same manner for all image points.

Figure 2:
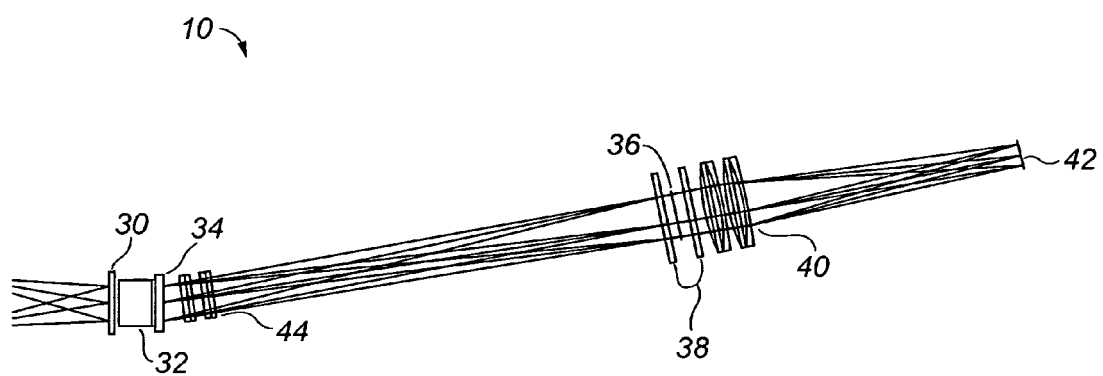
FIG. 2 is a schematic representation of a full-frame, multi-band programmable spectral imaging apparatus in accordance with another preferred embodiment of the present invention.

As shown in FIG. 2, a second preferred embodiment of the apparatus 10 of the present invention including a microlens array 30 and a capillary array 32 for directing all of the incoming light onto a transmission grating 34 at the same angle. The second preferred apparatus 10 can further include a liquid crystal device (LCD) array 36 disposed between two or more crossed polarizers 38 for analyzing the spectral information therein. At least one final optic 40 preferably recombines the wavelengths and forms a manipulated-white-light image at a detector array 42, after which the image may be further analyzed and displayed using a signal processor as described above. In one variation of the second preferred apparatus 10, a micro-shutter array (not shown) can be used in place of or in addition to the liquid crystal device array 36 and accompanying polarizers 38. As shown in FIG. 2, the second preferred apparatus 10 can include additional optical elements 44, such as lenses, mirrors, mirror arrays, and the like to direct and/or focus the light leaving the transmission grating 34.

Figure 3:
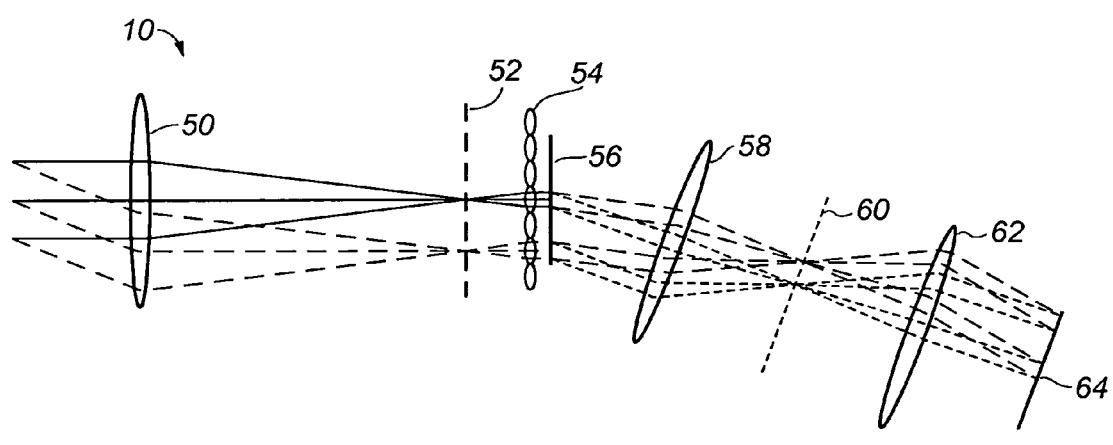
FIG. 3 is a schematic representation of a full-frame, multi-band programmable spectral imaging apparatus in accordance with another preferred embodiment of the present invention.

As shown in FIG. 3, a third preferred embodiment of the apparatus can include an aperture array 52, a microlens array 54 and a transmission grating 56. Preferably, the aperture array 52 and the microlens array 54 can function like the capillary array or micro-louvre array 24 in the previously discussed preferred embodiments. The microlens array 54 is preferably coupled with the matched aperture array 52 located at the micro-lens focal distance in front of the microlens array 54. Preferably, a direction-defining aperture and tiny lens can be placed at each pixel location at the initial image plane, thereby aiming the emerging light in the required direction, which as noted above is the same for all image points. The transmission grating 56 preferably produces a parallel array of independent micro-spectrometers, one for each pixel. The microlens array 54 can be of any suitable type or configuration, in both visible and IR materials. Suitable aperture arrays 52 of virtually any configuration can be fabricated using any of several standard technologies such as photolithography, laser patterning, or film deposition techniques through which the spacing of the apertures is preferably matched with that of the micro-lenses. The micro-apertures in the aperture array can be a variety of shapes, ranging from circular to slit-shaped. For example, a one-dimensional array of slit-shaped apertures, coupled with micro-lenses arranged in a rectangular array provides a desirable combination of tight directional control in the spectral dispersion dimension, and high throughput arising from the lack of directional restriction in the orthogonal dimension where directional control is not required.

As shown in FIG. 3, the third preferred apparatus 10 can further include an addressable spatial light modulator spectral selector 60 and one or more additional optical elements 58, 62, and a detector array 64. Preferably, the addressable spatial light modulator spectral selector can include a micromirror array or combination of micro-mirror arrays as described elsewhere herein. The additional optical elements 58, 62 can include for example any suitable combination of lenses, mirrors, mirror arrays, and the like to direct the light in the desired direction. As noted above, a suitable detector array 64 can include a CCD or any other alternative photodetector configured to detect light within the desired spectrum and/or with the desired precision.

Each of the preferred embodiments of the present invention described with reference to FIGS. 1, 2, and 3 include one or more micro-optical arrays. As noted above, the micro-optical arrays function in part to present the spectral dispersive element with light arriving at the same angle of incidence for all image points and rejecting light propagating in other directions. This function can also be achieved using more conventional macroscopic optics by configuring the macroscopic optical elements of the initial imaging segment of the apparatus in a telecentric configuration, preferred embodiments of which are described below with reference to FIGS. 4A, 4B, 5 and 6.

Figure 4A:
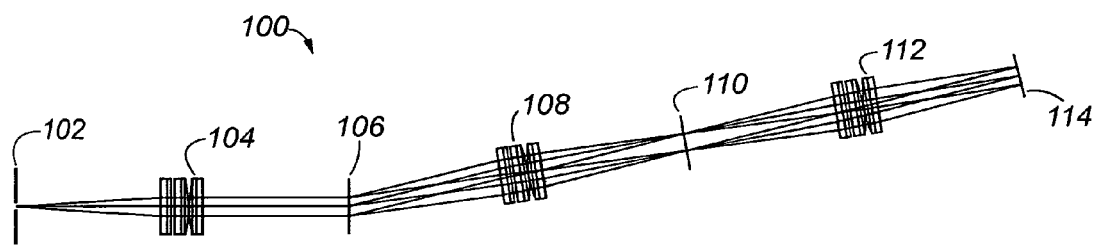
FIGS. 4A and 4B are schematic representations of a full-frame, multi-band programmable spectral imaging apparatus in accordance with another preferred embodiment of the present invention.

As shown in FIGS. 4A (plan view) and 4B (side view), another preferred embodiment of the full-frame, multi-band programmable spectral imaging apparatus 100 of the present invention can include one or more telecentric optics to achieve the desired image-position-independent constant angle of incidence on the dispersing element 106, such as a transmission grating. The fourth preferred embodiment can include a slit-shaped aperture 102, which functions as the entrance pupil of the optical system. Preferably, the aperture 102 can be placed one focal length in front of the first imaging optic 104, a configuration which ensures that the subsequent image is telecentric, i.e. that the chief rays originating from every field point are parallel to each other. The slit-shaped aperture 102 preferably ensures that only a narrow range of angles around the chief rays impinge on the transmission grating 106, providing high spectral resolution. Preferably, a wide range of angles in the orthogonal direction are permitted in order to admit as much light as possible into the preferred apparatus 100. The scene is preferably imaged in this telecentric fashion onto the dispersive element 106, which spectrally disperses the light. At least one second optic 108 preferably collects this spectrally-dispersed light and focuses the spectrum onto a programmable array 110. The programmable array can include for example a micro-shutter array or an LCD array between crossed polarizers as described above. Preferably, a spectrally-dispersed image of the slit entrance pupil 102 is focused onto the programmable array 110, with light from all field locations focused onto a uniquely-located slit-shaped image of the pupil for each wavelength. As in the previously described preferred embodiments, the programmable array preferably passes desired wavelengths and blocks others. The fourth preferred apparatus 100 can optionally include at least one final optic 112 that collects the spectrally-manipulated transmitted light and focuses it to a final image of the scene on the detector array 114. The respective optics 104, 108, 112 can include for example any suitable combination of lenses, mirrors, mirror arrays, and the like to direct the light in the desired direction. As noted above, the detector array 114 can include for example a CCD array and/or any other type of photodetector.

Figure 4B:
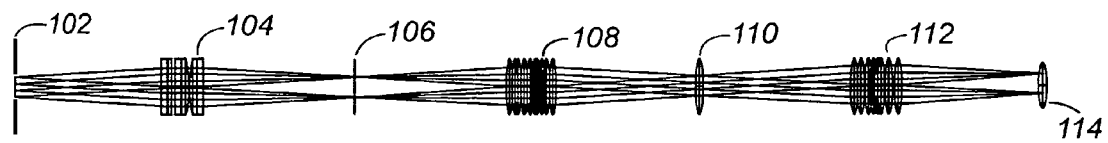

As represented in FIGS. 4A and 4B, each stage of the fourth preferred apparatus 100—slit 102, first optic 104, diffraction element 106, second optic 108, programmable array 110, third optic 112, and detector array 114—is arranged in a substantially telecentric configuration, with elements spaced by the focal length of the respective optical element. However, those of skill in the art will recognize that there are many suitable variations of the fourth preferred apparatus 100 in which only portions or segments of the preferred apparatus 100 are arranged in a substantially telecentric manner. For example, only the first stage to the diffraction element 106 can substantially telecentric, while the remainder of the optical path can be arranged in any suitable fashion or package subject to the deployment and/or use requirements of the fourth preferred apparatus 100.

Figure 5:
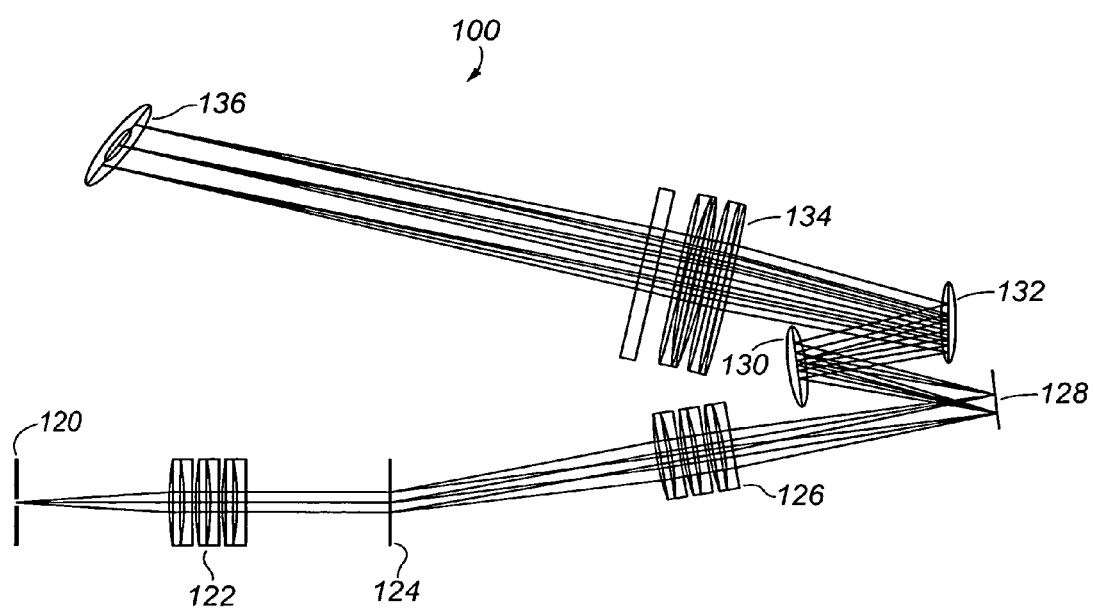
FIG. 5 is a schematic representation of a full-frame, multi-band programmable spectral imaging apparatus in accordance with another preferred embodiment of the present invention.

As shown in FIG. 5, another preferred embodiment of the full-frame, multi-band programmable spectral imaging apparatus 100 can include one or more telecentric optics to achieve the desired image-position-independent constant angle of incidence on the dispersing element 124. The fifth preferred apparatus 100 can also include a micro-mirror array with diagonally-tilted micro-mirrors (for example the Texas Instruments DLP® array) as a programmable spectral selector 128. The fifth preferred apparatus 100 can also include and two orthogonally-dispersing diffraction gratings 130, 132 to compensate for the two-dimensional grating-like spectral dispersion inherent to micro-mirror devices having diagonally tilted micro-mirrors as their only selectable positions.

A first stage of the fifth preferred apparatus 100 places a telecentric image of the scene onto the spectral dispersing element 124, in this case a transmission grating, using a slit-shaped aperture 120 as an entrance pupil located approximately one focal length in front of a first optic 122 as in the fourth preferred embodiment. The spectrally-dispersed light emerging from the dispersing element 124 is preferably collected by at least one second optic 126 and focused onto the micro-mirror array 128, forming a spectrally-dispersed image of the slit entrance pupil. The second optic 126 is preferrably arranged so that this dispersed slit image is telecentric on the micro-mirror array 128, such that the central rays, i.e. the rays originating from the center of the field of view, are parallel for every wavelength as they impinge on the micro-mirror array 128. The micro-mirror array 128 preferably reflects and diffracts light of the selected wavelengths in a direction defined by the micro-mirror tilt angle and by the allowed diffraction orders determined by the spacing of the micro-mirror grid, effectively behaving as a two-dimensional blazed diffraction grating producing a two-dimensional grid of diffraction orders.

In order to form a final spectrally-manipulated white light image free of spectral dispersion, the various diffraction orders are preferably recombined and their spectral dispersion reversed in the fifth preferred apparatus 100. Accordingly, the fifth preferred apparatus 100 can include two reflection gratings 130, 132, the grooves of which are oriented approximately orthogonal to each other, and the groove spacing and blaze angle of which substantially match those of the respective two dimensions of the micro-mirror array 128. Preferably, the fifth preferred apparatus 100 can include at least one final optic 134 that collects the recombined de-dispersed diffraction orders, and focuses them to a final non-dispersed image on a detector array 136. The optics 122, 126, 134 can include for example any suitable combination of lenses, mirrors, mirror arrays, and the like to direct the light in the desired direction. As noted above, the detector array 136 can include a CCD array or any other suitable photodetector configured for the particular properties of the light being imaged.

Figure 6:
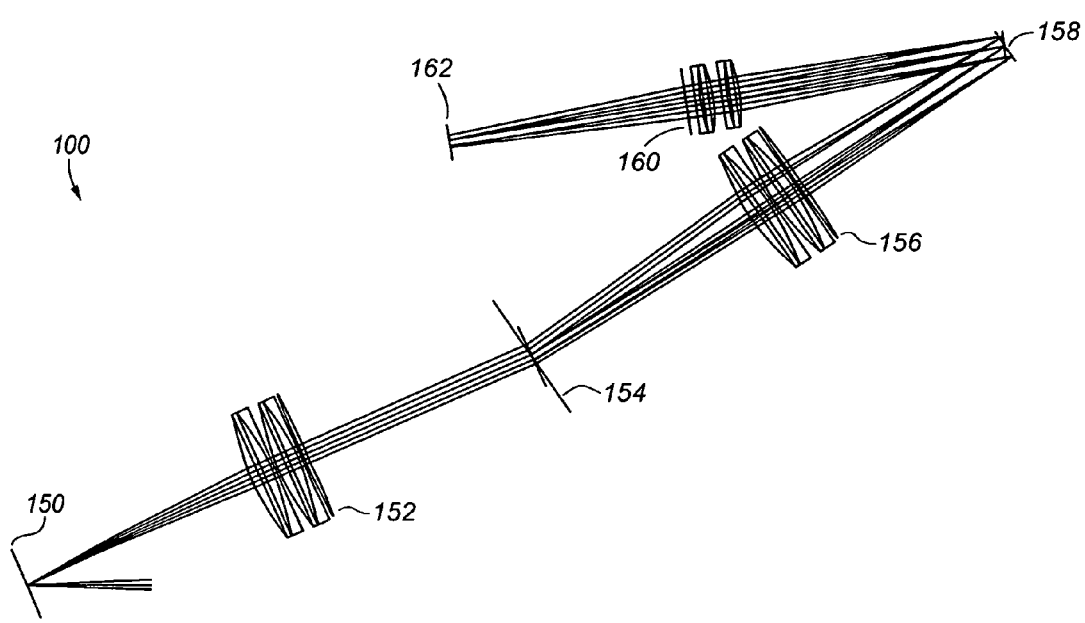
FIG. 6 is a schematic representation of a full-frame, multi-band programmable spectral imaging apparatus in accordance with another preferred embodiment of the present invention.

As shown in FIG. 6, another preferred embodiment of the full-frame, multi-band programmable spectral imaging apparatus 100 of the present invention can include a first micro-mirror array 150 to pre-compensate for the diffraction properties of a second spectral selection micro-mirror array 158. As in the preferred embodiments described with reference to FIGS. 4 and 5, the optics in the sixth preferred apparatus 100 can be arranged in a telecentric configuration. Preferably, a slit-shaped aperture (not shown) that functions as an entrance pupil can be substantially co-located with the first micro-mirror array 150 substantially identical in its physical layout to the second micro-mirror array 158. The co-location of the entrance pupil and the first micro-mirror array 150 can be accomplished either by programming a slit-shaped pattern of "on" micro-mirrors on the first micro-mirror array 150, or by placing a physical slit or aperture immediately in front of the first micro-mirror array 150 with all its mirrors turned to the "on" position. Alternatively, a fixed, non-programmable two-dimensional diffraction grating (not shown), of the same grid spacing and blaze angle as the first micro-mirror array 150 can be placed at this location in lieu of the first micro-mirror array 150.

As shown in FIG. 6, a first optic 152 is preferably located approximately one focal length beyond the first micro-mirror array 150. The first optic 152 preferably functions to produce an image of the scene on the dispersing element 154, in this example a transmission grating. Preferably, the image is telecentric but diffracted and spectrally dispersed in a manner that will be exactly reversed by the second micro-mirror array 158 that performs the programmable spectral selection. A second optic 156 that is substantially identical in focal length to the first optic 152 is preferably located one focal length beyond the dispersing element 154. The second optic 156 preferably collects the spectrally dispersed light and focuses a spectrally-dispersed image of the slit-shaped entrance pupil onto the second micro-mirror array 158. The second optic 156 is preferably situated so that, at the spectrum image on the second micro-mirror array 158, the rays corresponding to each wavelength arrive in such a manner that, after the spectral dispersion of second micro-mirror array 158 reverses that of the first micro-mirror array 150, the light leaving the second micro-mirror array 158 is substantially telecentric, with the central ray for each wavelength being substantially parallel to the central rays for all other wavelengths. As in the previous preferred embodiments, and despite the spectral dispersion of the first micro-mirror array 150, light from all field points is focused to a uniquely-located slit image for each wavelength. The second micro-mirror array 158 preferably selects the desired wavelengths and simultaneously reverses the spectral dispersion effects of the first micromirror array 150. The sixth preferred apparatus 100 can include at least one final optic 160 that collects the spectrally selected light and focuses it to a non-dispersed image at a detector array 162, which can include a CCD array or any other suitable photodetector. As noted above, the optics 152, 156, 160 can include for example any suitable combination of lenses, mirrors, mirror arrays, and the like to direct the light in the desired direction.

A alternative embodiment of a micro-mirror-array-based multi-band programmable spectral imaging apparatus can be realized using a micro-mirror array in which the micro-mirrors, as one of their programmable orientations, can be set to lie flat in the plane of the array rather just to two tilted orientations. With micro-mirrors set to the flat orientation, that region of the micro-mirror array behaves as a simple mirror, rather than a diffraction grating, so that there is no spectral dispersion to compensate and no need for either compensating gratings or a second compensating micro-mirror array. In this alternative embodiment of the preferred apparatuses 10, 100, the flat micro-mirror represents the "on" state, and the array is oriented so that this micro-mirror position reflects the light down the optical train toward the detector. The tilted micro-mirror setting represents the "off" state, with light being diverted from the optical train and away from the detector. This tilted setting will produce diffraction and associated spectral dispersion, but this is no consequence because the light reflected by this setting is not used but is instead directed to an absorbing baffle or beam dump. This alternative embodiment offers the simplicity of eliminating compensating gratings or micro-mirror arrays, and it also offers greater optical throughput because losses due to multiple diffraction orders are eliminated.

The preferred embodiments have been described with reference to particular optical components arranged in selected configurations for illustrative purposes only. However, variations of the preferred apparatuses 10, 100 can include configurations in which the initial optical element/s is/are one or more of a telecentric imaging lens; an imaging element and a microlens array; an aperture array optically coupled to the microlens array; an imaging element and a capillary array; and/or an imaging element and a microlouvre array. Additional variations of the preferred apparatuses 10, 100 include configurations in which the dispersive element/s is/are one or more of a refraction grating, a transmission grating, a diffraction disperser, an interferometric disperser, or a refractive disperser. Additional variations of the preferred apparatuses 10, 100 include configurations in which the selective element/s is/are one or more of a microshutter array, an LCD array, a micromirror array, a mask, or a slit array. Accordingly, there are innumerable permutations of just the foregoing optical components that can be arranged in innumerable geometrical configurations, including substantially telecentric configurations. It will therefore be appreciated that the foregoing preferred embodiments are described for exemplary purposes, and that there are substantially more embodiments of the present invention that fall within the scope of the appended claims.

Example Embodiments

Figure 7:
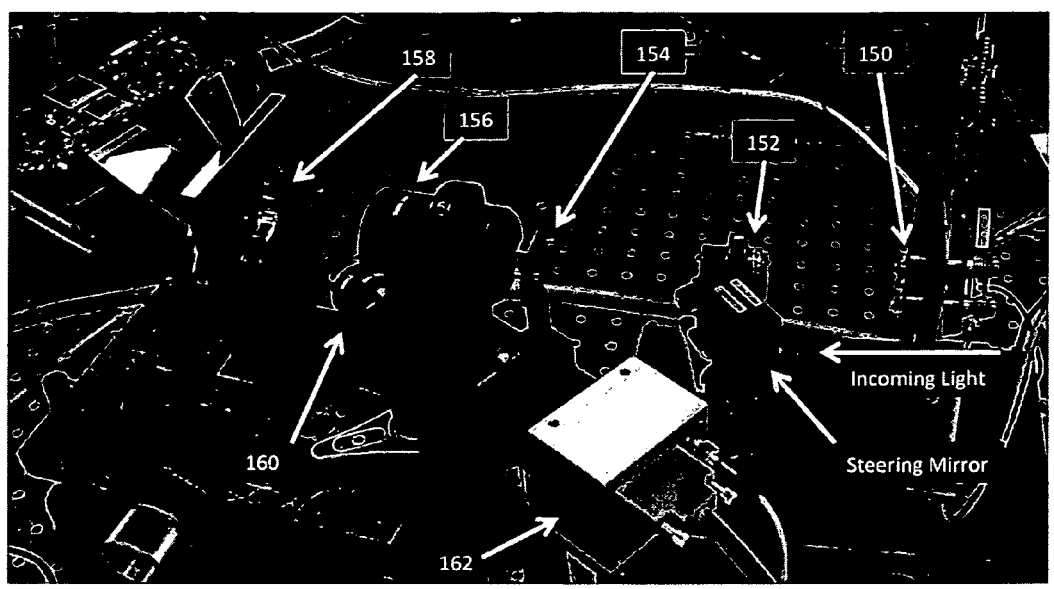
FIG. 7 is a photograph of a working prototype of one example implementation of the full-frame, multi-band programmable spectral imaging apparatus of the preferred embodiments of the present invention.

FIG. 7 is a photograph of a working prototype of a dual micro-mirror array embodiment of the full-frame, multi-band programmable spectral imaging apparatus of the preferred embodiment described above with reference to FIG. 6.

Figure 8:
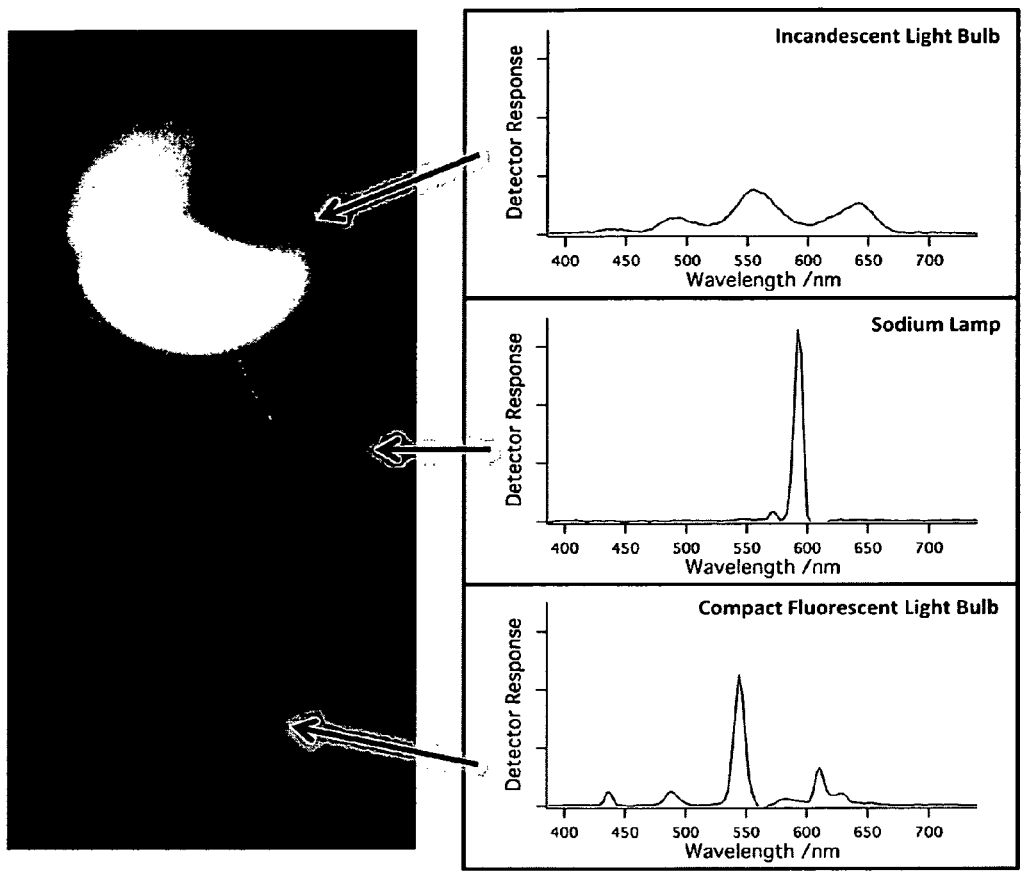
FIG. 8 is a panchromatic image and spectra of an incandescent lamp, a low-pressure sodium lamp, and a compact fluorescent lamp, from a hyperspectral image cube obtained using the Hadamard transform technique with the example apparatus shown in FIG. 7.

FIG. 8 shows data from a complete-spectrum hyperspectral image of a test scene, obtained using the apparatus shown in FIG. 7, in which the spectral selection micromirror array was programmed to perform a 127-band, 400 nm to 740 nm implementation of the Hadamard transform technique. On the left of FIG. 8 is a panchromatic image of the test scene, produced by summing over all 127 spectral bands of the hyperspectral data cube. The test scene consists of three light sources: a standard broad-spectrum incandescent lamp at the top; a single line, discrete-spectrum, low-pressure sodium vapor lamp in the center; and a multi-line, discrete-spectrum compact fluorescent lamp (CFL) at the bottom. The displayed spectra to the right of the image, which are shown here in their raw, radiometrically uncalibrated form, were obtained through averaging pixels from small regions of the hyperspectral image representative of each light source in the scene. The incandescent spectrum shown at the top displays the broad-spectrum characteristics expected of a quasi-blackbody spectrum, but with additional spectral structure arising from the spectral response functions of both the CCD detector array and the two micro-mirror arrays. The second spectrum shows the strong single-line spectrum of the sodium vapor lamp. The final spectrum shows the multi-line, discrete spectrum of the compact fluorescent lamp, dominated by the mercury vapor emission lines common to most fluorescent lamps.

Figure 9:
FIG. 9 is a series of multi-band spectrally filtered images of an incandescent lamp and a compact fluorescent lamp, obtained using the example apparatus of FIG. 7, illustrating how the example apparatus can select spectral bands so that one type of lamp is emphasized in the image while the other is suppressed.
Figure 9:
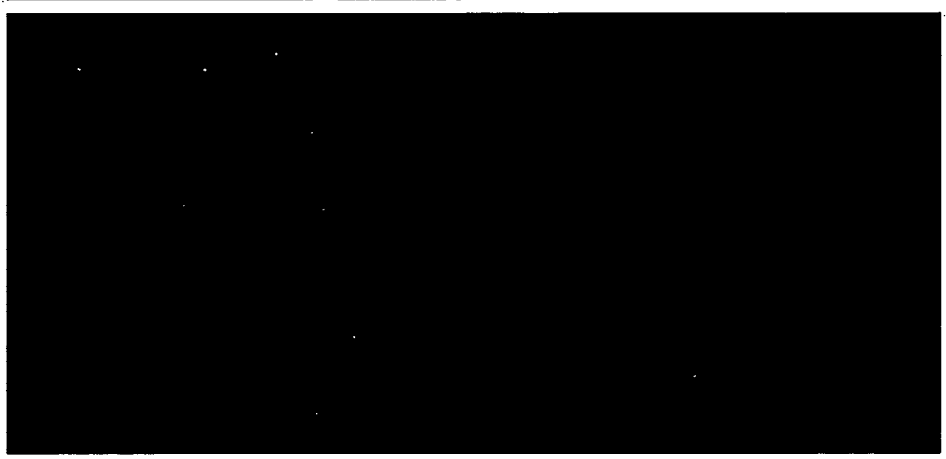
Figure 9:

FIG. 9 shows a series of three spectrally filtered images obtained using the apparatus shown in FIG. 7, illustrating how the programmable multi-band spectral filtering capability of the example apparatus can be used to distinguish one type of target from another based on their spectral characteristics, and to highlight a particular target type in the real-time displayed image. In all three images, the test scene includes two light bulbs: a standard broad-spectrum incandescent lamp on the left, and a multi-line discrete-spectrum compact fluorescent lamp (CFL) on the right. The spectrum of the CFL obtained with the example apparatus is shown in FIG. 8. Both lamps are on at full brightness for all three images; the differences in brightness seen in the three images result from the action of the programmable spectral filter, not from changes in the light bulbs themselves.

In the first image (a), the spectral selection micro-mirror array was programmed to pass three narrow-wavelength bands corresponding to the brightest spectral lines of the CFL spectrum. The CFL appears bright in this image because most of its light is emitted in these spectral bands, but the incandescent lamp also appears relatively bright as well, because its continuous spectrum contains considerable energy in these spectral bands as well. In the second image (b), the micro-mirror array was programmed to pass three narrow-wavelength spectral bands located in the dark regions between the CFL's major emission lines. The CFL appears dark in this image, because nearly all of its discrete-spectrum light is being blocked by the programmable filter. The incandescent lamp, however, appears the same brightness as in the first image, because its continuous-spectrum emission contains comparable energy in this second set of spectral bands. It is noteworthy that the CFL's light has been so effectively suppressed by the programmable filter that, even though both lamps are on, the reflection of the incandescent bulb can be seen on the surface of the CFL. The third image (c) shows the difference between the first two images. The widths of the spectral bands in the first two images were chosen so that the incandescent lamp, normalized for the responsivity of the total example apparatus, contained the same integrated energy in both images. In the third difference image the brightness of the incandescent bulb appears to be near-zero, even though the bulb is on. In this case, the incandescent bulb is so effectively suppressed that the reflection of the CFL from its surface can be seen. This third image can be thought of as a background-suppressing matched-filter image, where the background is the incandescent lamp spectrum and the target is the CFL spectrum. A similar process can be used in the infrared region, as an example, to highlight a particular chemical vapor in a scene consisting of a plume of that chemical vapor viewed against a spectrally complex background.

As described in detail above, the principles generally set forth in the following claims can be achieved by incorporating micro-fabricated two-dimensional micro-array optical elements, such as the micro-lens array, micro-louvre array, and/or capillary array and/or using telecentric optics to form the image-position-independent constant angle of incidence on a dispersing element. As noted herein, the generation of the desired image permits the wavelengths selected by the micro-mirror array/s or other addressable spatial light modulator device/s to be the same throughout the image. With such full-frame capability, the selected spectral bands can be programmed and reprogrammed, over the entire image, on millisecond timescales, thereby allowing background-suppressing matched filters to be implemented at real-time video rates.

Applications of the preferred apparatuses 10, 100 range from rapid, broad-band searches for military/intelligence targets (with the required time for scanning a given area reduced by two to three orders of magnitude over traditional hyperspectral imagers), real-time medical imaging, spectral monitoring of rapid transients, spectrum-based tracking of vehicles and individuals, and (when coupled with the appropriate ultra-fast detector) ultra-fast spectral imaging on nanosecond timescales. In other applications, the preferred apparatuses 10, 100 can be used as a spectral matched filter for: any predetermined chemical, solid, liquid, gas, substance, or mixture; any predetermined biological tissue or medical abnormality; any predetermined mineral type; any forensic signature. As an example, the preferred apparatuses 10, 100 can be deployed as remote sensors for particular types of chemicals having known spectral characteristics, such as methane, carbon dioxide, carbon monoxide, ozone, or any other chemical or byproduct of energy production, industry, manufacturing, and/or transportation.

Throughout the foregoing description of the invention, it is to be understood that the term "light" refers to electromagnetic radiation of any wavelength, including ultraviolet, visible, and infrared wavelengths, and that the invention is not limited to any particular wavelength range.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An imaging system comprising:
   an initial optical subsystem receiving incident light and generating a two dimensional image comprising spatially invariant light propagation defining a substantially spatially invariant angle of incidence at a first predetermined location comprising a two dimensional image plane;
   a dispersive element disposed at the first predetermined location to receive the two dimensional image at the spatially invariant angle of incidence and to generate wavelength dispersed light;
   a second optical subsystem receiving the wavelength dispersed light and generating a spatially dispersed spectrum at a second predetermined location where in at least one dimension of a spectral plane, light of a predetermined wavelength is directed to a substantially identical position within the spectral plane;
   a selective element disposed at the second predetermined location and optically coupled to the dispersive element, the selective element configured to programmably modulate an amplitude of light at one or more locations in the spectral plane to produce spectrally modified light and wherein the selective element manipulates the entire two dimensional image simultaneously; and
   a detector array receiving the spectrally modified light from the selective element, wherein the spectrally modified light comprises a two dimensional image representation of the incident light in which the spectral content has been modified by the selective element in one or more spectral bands, and wherein such spectral modification is substantially identical for substantially all locations in the two dimensional image representation and wherein the entire two dimensional image representation is collected at once by the detector array.

2. The imaging system of claim 1, further comprising a display coupled to the detector array and configured to display at least a portion of the two dimensional image representation of the incident light.

3. The imaging system of claim 1, wherein the initial optical element comprises a telecentric imaging lens.

4. The imaging system of claim 1, wherein the initial optical element comprises an imaging element and a micro-lens array.

5. The imaging system of claim 4, further comprising an aperture array optically coupled to the microlens array.

6. The imaging system of claim 1, wherein the initial optical element comprises an imaging element and a capillary array.

7. The imaging system of claim 1, wherein the initial optical element comprises an imaging element and a microlouvre array.

8. The imaging system of claim 1, wherein the dispersive element comprises one of a refraction grating, a transmission grating, a diffraction disperser, an interferometric disperser, or a refractive disperser.

9. The imaging system of claim 1, wherein the selective element comprises one of a mircoshutter array, an LCD array, a micromirror array, a mask, or a slit array.

10. The imaging system of claim 1, wherein the selective element comprises one of a mircoshutter array, an LCD array, a micromirror array, a mask, or a slit array.

11. The imaging system of claim 1, further comprising an entrance pupil disposed between the initial optical element and a source of the incident light.

12. The imaging system of claim 11, wherein the entrance pupil comprises one of a slit entrance pupil, a micromirror array coupled with a physical slit entrance pupil, or a micromirror array programmed to simulate a slit entrance pupil.

13. The imaging system of claim 1, wherein the selective element comprises a programmable micromirror array, and further comprising a second programmable micromirror array disposed between the initial optical element and a source of the incident light.

14. The imaging system of claim 1, further comprising a controller coupled to the detector array and configured to perform hyperspectral image processing on the multispectral image representation of the incident light.

15. The imaging system of claim 14, wherein the controller is integrated with the detector array.

16. The imaging system of claim 1, wherein the selective element is programmable to perform hyperspectral imaging by the Hadamard transform technique.

17. The imaging system of claim 1, wherein the selective element is programmable as a spectral matched filter for a predetermined chemical, solid, liquid, gas, substance, or mixture.

18. The imaging system of claim 1, wherein the selective element is programmable as a spectral matched filter for a predetermined biological tissue or medical abnormality.

19. The imaging system of claim 1, wherein the selective element is programmable as a spectral matched filter for a predetermined mineral type.

20. The imaging system of claim 1, wherein the selective element is programmable as a spectral matched filter for a forensic signature.

21. The imaging system of claim 1, wherein the selective element's selected spectral bands are reprogrammable, over the entire image, each millisecond.

\* \* \* \* \*